(12) United States Patent
Sakata

(10) Patent No.: US 11,869,284 B2
(45) Date of Patent: Jan. 9, 2024

(54) FAILURE DIAGNOSIS DEVICE, FAILURE DIAGNOSIS SYSTEM, FAILURE DIAGNOSIS METHOD, AND FAILURE DIAGNOSIS PROGRAM

(71) Applicant: NEC Corporation, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/781,601

(22) PCT Filed: Oct. 7, 2020

(86) PCT No.: PCT/JP2020/037952
§ 371 (c)(1),
(2) Date: Jun. 1, 2022

(87) PCT Pub. No.: WO2021/111727
PCT Pub. Date: Jun. 10, 2021

(65) Prior Publication Data
US 2022/0415099 A1     Dec. 29, 2022

(30) Foreign Application Priority Data

Dec. 5, 2019 (JP) ................................ 2019-220333

(51) Int. Cl.
*G07C 5/02* (2006.01)
*B60R 16/023* (2006.01)
*B60W 50/02* (2012.01)

(52) U.S. Cl.
CPC ............ *G07C 5/02* (2013.01); *B60R 16/0232* (2013.01); *B60W 50/0225* (2013.01)

(58) Field of Classification Search
CPC ... G07C 5/02; B60R 16/0232; B60W 50/0225
See application file for complete search history.

(56) References Cited

U.S. PATENT DOCUMENTS

| 11,385,950 | B2* | 7/2022 | Shetty | ................... | G06F 11/008 |
| 2012/0277949 | A1* | 11/2012 | Ghimire | ................. | G07C 5/008 |
| | | | | | 701/31.7 |
| 2019/0042675 | A1* | 2/2019 | Martin | ................... | G06N 20/00 |

FOREIGN PATENT DOCUMENTS

| JP | 2004-268633 | A | 9/2004 |
| JP | 2006-053016 | A | 2/2006 |
| JP | 2009-243428 | A | 10/2009 |
| JP | 2014-234113 | A | 12/2014 |
| JP | 2015-158421 | A | 9/2015 |

(Continued)

OTHER PUBLICATIONS

International Search Report for PCT Application No. PCT/JP2020/037952, dated Dec. 8, 2020.

(Continued)

*Primary Examiner* — Gertrude Arthur Jeanglaude
(74) *Attorney, Agent, or Firm* — Sughrue Mion, PLLC

(57) ABSTRACT

A fault diagnostic device 80 includes an input unit 81 and a generation unit 82. The input unit 81 receives input of observation data of a vehicle operating at a predetermined speed. The generation unit 82 extracts time series features of the observation data as features indicating a normal condition, and generates a feature master indicating the normal condition of the vehicle based on the extracted features.

12 Claims, 6 Drawing Sheets

(56) References Cited

FOREIGN PATENT DOCUMENTS

JP          2016-215787 A     12/2016

OTHER PUBLICATIONS

Dongjin Song, Ning Xia, Wei Cheng, Haifeng Chen, Dacheng Tao, "Deep r-th Root of Rank Supervised Joint BinaryEmbedding for Multivariate Time Series Retrieval", KDD 2018, Proceedings of the 24th ACM SIGKDD InternationalConference on Knowledge Discovery & Data Mining, pp. 2229-2238, Aug. 19-23, 2018, London, UK.

Japanese Office Action dated Jun. 13, 2023 in Japanese Application No. 2021-562478.

* cited by examiner

FAILURE DIAGNOSIS DEVICE, FAILURE DIAGNOSIS SYSTEM, FAILURE DIAGNOSIS METHOD, AND FAILURE DIAGNOSIS PROGRAM

This application is a National Stage Entry of PCT/JP2020/037952 filed on Oct. 7, 2020, which claims priority from Japanese Patent Application 2019-220333 filed on Dec. 5, 2019, the contents of all of which are incorporated herein by reference, in their entirety.

TECHNICAL FIELD

The present invention relates to a fault diagnosis device, a fault diagnosis system, a fault diagnosis method and a fault diagnosis program for diagnosing vehicle faults.

BACKGROUND ART

Currently, general vehicles are equipped with a system to grasp the content of faults that have occurred. Specifically, when a fault occurs in a vehicle, a DTC (Diagnostic Trouble Code) is output, and by reading the output DTC, it is possible to investigate the factors (fault location and fault content) that caused the fault of the vehicle.

On the other hand, it is preferable to detect a sign of fault in advance and repair it before the vehicle breaks down, instead of responding after the vehicle breaks down. In this regard, for example, patent literature 1 describes a vehicle fault diagnosis device that predicts when a vehicle will break down. The device described in the patent literature 1 maintains a fault pattern that represents the process until vehicle control system faults in time series, and predicts the fault timing of the vehicle control system by comparing the fault pattern with the history of learning values actually used in the vehicle control system of the vehicle in the past.

In addition, patent literature 2 describes a fault diagnosis device that accurately diagnoses faults regardless of the type of vehicle. The fault diagnosis device described in the patent literature 2 obtains normal data obtained by sensors mounted on each vehicle when the vehicle is normal. The above fault diagnosis device then analyzes the distribution of multiple normal data obtained from multiple types of vehicles, and based on the distribution of the multiple normal data, generates a correction value for each type of vehicle such that the distribution of these normal data is closer.

Non-patent literature 1 describes a method for extracting features from time series data.

CITATION LIST

Patent Literature

PTL 1: Japanese Patent Laid-Open No. 2006-53016
PTL 2: Japanese Patent Laid-Open No. 2015-158421

Non-Patent Literature

NPL 1: Dongjin Song, Ning Xia, Wei Cheng, Haifeng Chen, Dacheng Tao, "Deep r-th Root Rank Supervised Joint Binary Embedding for Multivariate Time Series Retrieval", KDD '18 Proceedings of the 24th ACM SIGKDD International Conference on Knowledge Discovery & Data Mining, pp. 2229-2238, August, 2018.

SUMMARY OF INVENTION

Technical Problem

Noise and odor in a vehicle that can be sensed by humans can be considered a sign of a fault. Therefore, it is possible to detect signs of some kind of fault by installing sensors in vehicles that can detect such unusual noises and odors. However, not all vehicles are necessarily equipped with sensors to detect such events in general, and it is not realistic to install all the sensors that are assumed to detect faults in a vehicle. Therefore, it is preferable to be able to generate information for diagnosing vehicle faults from information that can be collected in a general vehicle without installing special sensors.

The vehicle fault diagnostic device described in the patent literature 1 generates a fault pattern based on the relationship with the elapsed years and predicts faults based on the fault pattern. However, even if the device described in the patent literature 1 can predict faults due to age-related deterioration, etc., it cannot detect the signs of faults that may occur in daily life.

The fault diagnosis device described in the patent literature 2 assumes the existence of sensor data (normal data) for each driving scene obtained when each vehicle is normal. For example, in a situation where there are few environmental changes, such as in a factory, it is highly possible to obtain normal data for each device. However, in the case of a vehicle, it is difficult to determine whether the vehicle is in a normal condition in general, and it is easily affected by the driving scene, such as the driving location, and the driving environment, such as the weather, making it difficult to obtained data that can be called normal.

Therefore, it is an exemplary object of the present invention is to provide a fault diagnosis device, a fault diagnosis system, a fault diagnosis method, and a fault diagnosis program capable of generating information that can be used to diagnose the normal condition of a vehicle.

Solution to Problem

A fault diagnosis device according to the exemplary aspect of the present invention includes an input unit for receiving input of observation data of a vehicle operating at a predetermined speed, and a generation unit for extracting time series features of the observation data as features indicating a normal condition, and generating a feature master indicating the normal condition of the vehicle based on the extracted features.

A fault diagnosis system according to the exemplary aspect of the present invention includes the above-mentioned fault diagnostic device, and a target vehicle which receives information from the fault diagnostic device, wherein the fault diagnostic device includes a first transmitting unit for transmitting the generated feature master to the target vehicle, and wherein the target vehicle includes a control means for detecting a sign of fault by determining the similarity between the features of the observation data included in the received feature master and the observation data obtained in the own target vehicle.

A fault diagnosis method according to the exemplary aspect of the present invention, wherein the computer receives the input of the observation data of the vehicle operating at a speed of 0, and wherein the computer extracts the time series features of the observation data as features indicating the normal condition of the vehicle during idling.

A fault diagnosis program according to the exemplary aspect of the present invention causes a computer to execute, an input process of receiving input of observation data of a vehicle operating at a predetermined speed, and a generation process of extracting time series features of the observation data as features indicating a normal condition, and generating a feature master indicating the normal condition of the vehicle based on the extracted features.

Advantageous Effects of Invention

According to the exemplary aspect of the present invention, it is possible to generate information that can be used to diagnose the normal condition of a vehicle.

DESCRIPTION OF EMBODIMENTS

Hereinafter, exemplary embodiments of the present invention are described with reference to the drawings.

Exemplary Embodiment 1

Figure 1:
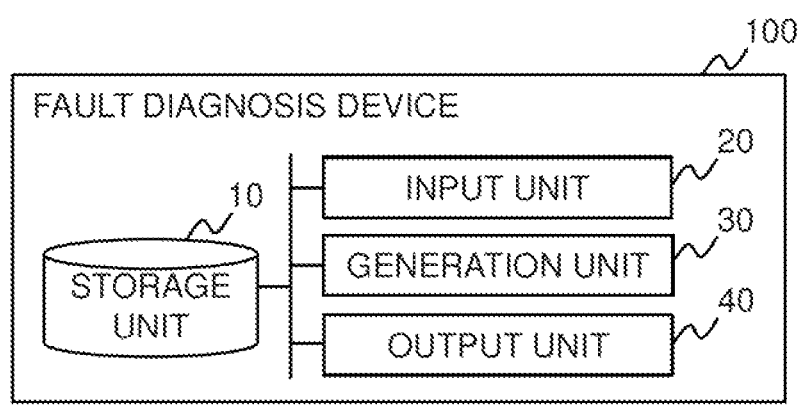
FIG. 1 It depicts a block diagram showing a configuration example of an exemplary embodiment of a fault diagnosis device according to the exemplary aspect of the present invention.

FIG. 1 is a block diagram showing a configuration example of a first exemplary embodiment of a fault diagnosis device according to the exemplary aspect of the present invention. The fault diagnosis device 100 of this exemplary embodiment comprises a storage unit 10, an input unit 20, a generation unit 30, and an output unit 40.

The storage unit 10 stores various information necessary for the fault diagnosis device 100 to perform a process. The storage unit 10 may also store fault data and observation data received by the input unit 20, which will be described later. The storage unit 10 is realized by a magnetic disk or the like, for example.

The input unit 20 receives input of observation data observed in time series by each device of the vehicle. Examples of devices include an engine, a water temperature sensor, and a battery. In general, CAN (Controller Area Network) is often used as a communication protocol for electronic control units (ECUs) in in-vehicle networks. Therefore, the input unit 20 may receive input of communication data specified by a CAN protocol as observation data. In addition, the input unit 20 may also receive input of data obtained by OBD (On-board diagnostics) as observation data. Data obtained by OBD may include an engine RPM and speed, a battery status, a water temperature, etc.

In this exemplary embodiment, the input unit 20 particularly receives input of observation data of a vehicle operating at a predetermined speed, in consideration of the environmental conditions in which the observation data is to be obtained. As an example, the input unit 20 may receive the input of the observation data for a vehicle that is idling (i.e., driven at speed=0). This is because, if the vehicle is idling, the environmental changes of the vehicle due to driving are considered to be minimal, and thus the steady state of the vehicle during idling can be considered a normal condition.

As another form, the input unit 20 may receive the input of the observation data of the vehicle driving at speeds higher than a predetermined speed (for example, 80 km/h) on a highway. When driving on a highway, the vehicle's environment changes to a small degree, but these changes are smaller than when driving on a regular road. Therefore, the condition indicated by the observation data obtained when driving on the highway can be considered a normal condition.

The form of the observation data is arbitrary, and the form of each data should be predetermined according to the information necessary for the generation unit 30 described later to perform a process.

The generation unit 30 extracts the time series features of the input observation data as features indicating normal conditions. The generation unit 30 then generates a feature master indicating the normal condition of the vehicle based on the extracted features. This is because the observation data input to the input unit 20 is considered to indicate the normal condition of the vehicle. Since the feature master represents the pattern of the normal condition, the feature master can be referred to as a pattern file.

For example, when the input unit 20 receives the input of the observation data of the vehicle operating a speed of 0, the generation unit 30 may extract the time series features of the observation data as features indicating the normal condition of the vehicle during idling. For example, if the input unit 20 receives the input of the observation data of the vehicle driving at speeds higher than a predetermined speed on a highway, the generation unit 30 may extract the time series features of the observation data as features indicating the normal condition of the vehicle operating at the speed or higher.

The method by which the generation unit 30 generates the feature master is arbitrary. Considering that the feature master is used for comparison with the observation data obtained by the vehicle, it is preferable to be able to extract features of the observation data in a compact form. Therefore, the generation unit 30 may generate observation data of a partial time series by dividing the observation data of a time series into multiple segments, extract common features for each segment, and generate a feature master that includes those features.

The generation unit 30 may also perform the so-called model-free analysis as described in the non-patent literature 1 on the observation data obtained in a time series. Model-free analysis is a technique for matching the similarity between the present and the past for observation data such as sensor values that are obtained in a time series, and is a technique for determining when the present condition is similar to a past condition. In this exemplary embodiment, model-free analysis determines whether the collected past fault conditions are similar to the observed data that is currently obtained.

Specifically, the generation unit 30 may generate a feature extraction engine for the system by learning the observation data obtained in time series through deep learning. Then, the generation unit 30 may extract features from the observation data using the generated feature extraction engine and generate a feature master, where the extracted features are normal conditions.

The generation unit 30 may also generate feature masters for each type of vehicle (vehicle type). This is because normal conditions may differ for each vehicle type. In this case, the generation unit 30 can group the observation data for each vehicle of the same type and generate a feature master for the grouped observation data.

Since the feature master generated in this exemplary embodiment indicates the features of the normal condition, if a feature indicating an unexpected normal condition is observed, there is a high possibility that the condition indicated by the feature will not be determined as a normal condition. Therefore, the generation unit 30 may generate a feature master to which features indicating a normal condition are newly added to the already generated feature master. For example, the generation unit 30 may add features that are manually determined to be in a normal condition to the feature master for features that may be determined not to be in a normal condition.

In addition, a feature that is assumed to be out of normal condition in a general environment may be determined to be in normal condition in a special environment. For example, in cold regions, the normal value of cooling water temperature is assumed to be lower than in a general environment. Therefore, the generation unit 30 may extract the time series features of the observation data obtained under the special environment as features indicating the normal condition of the vehicle in the special environment. The generation unit 30 may then generate a feature master with the newly added features. The special environment may include, for example, a highland, a slope, etc., as well as cold regions.

Furthermore, depending on the individuality of the driver, special operations may be determined as normal conditions. For example, when the driver performs an operation that is idling idle as a normal condition, the engine RPM will increase significantly during idling. In order to determine such a state as a normal condition, the generation unit 30 may extract the time series features of the observation data obtained according to the characteristics of the individual as features indicating the normal condition of the vehicle specific to the individual.

The output unit 40 outputs the generated feature master. The output unit 40 may transmit the feature master to the vehicle.

The input unit 20, the generation unit 30, and the output unit 40 are realized by a processor (for example, CPU (Central Processing Unit), GPU (Graphics Processing Unit)) of a computer that operates according to a program (a fault diagnosis program). For example, a program may be stored in the storage unit 10, and the processor may read the program and operate as the input unit 20, the generation unit 30, and the output unit 40 according to the program. In addition, the functions of the fault diagnostic device 100 may be provided in the form of SaaS (Software as a Service).

The input unit 20, the generation unit 30, and the output unit 40 may each be realized by dedicated hardware. Some or all of the components of each device may be realized by general-purpose or dedicated circuit, a processor, or combinations thereof. These may be configured by a single chip or by multiple chips connected through a bus. Some or all of the components of each device may be realized by a combination of the above-mentioned circuit, etc., and a program.

When some or all of the components of the fault diagnosis device 100 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

Figure 2:
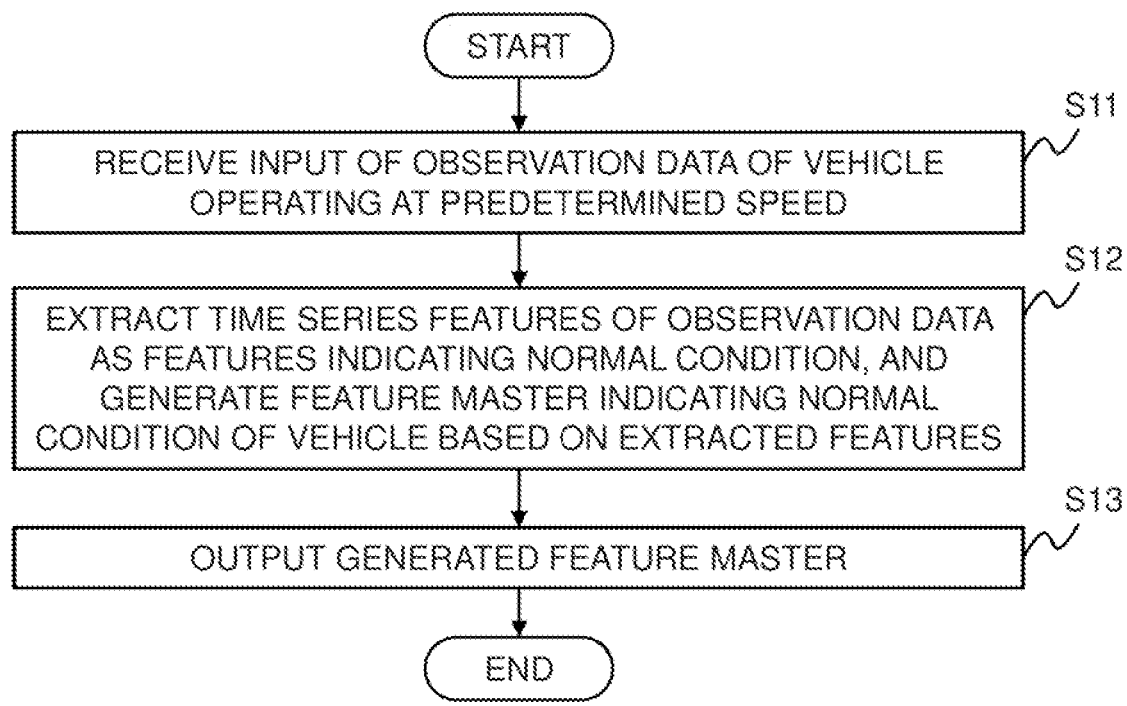
FIG. 2 It depicts a flowchart showing an operation example of a fault diagnosis device.

Next, the operation example of this exemplary embodiment will be described. FIG. 2 is a flowchart showing an operation example of the fault diagnosis device 100 of this exemplary embodiment.

The input unit 20 receives input of observation data of a vehicle operating at a predetermined speed (step S11). The generation unit 30 extracts time series features of the observation data as features indicating a normal condition, and generates a feature master indicating the normal condition of the vehicle based on the extracted features (step S12). The output unit 40 outputs the generated feature master (step S13).

As described above, in this exemplary embodiment, the input unit 20 receives input of observation data of a vehicle operating at a predetermined speed, and the generation unit 30 generates time series features of the observation data as features indicating a normal condition, and generates a feature master indicating the normal condition of the vehicle based on the extracted features. Therefore, it is possible to generate information (i.e., a feature master) that can be used to diagnose the normal condition of a vehicle.

Exemplary Embodiment 2

Next, a second exemplary embodiment of the present invention will be described. The second exemplary embodiment describes a method for detecting a sign of fault in a vehicle using the feature master generated in the first exemplary embodiment. This exemplary embodiment assumes an embodiment in which fault data and observation data are collected from a vehicle and feature masters generated from these data are distributed to vehicles.

Figure 3:
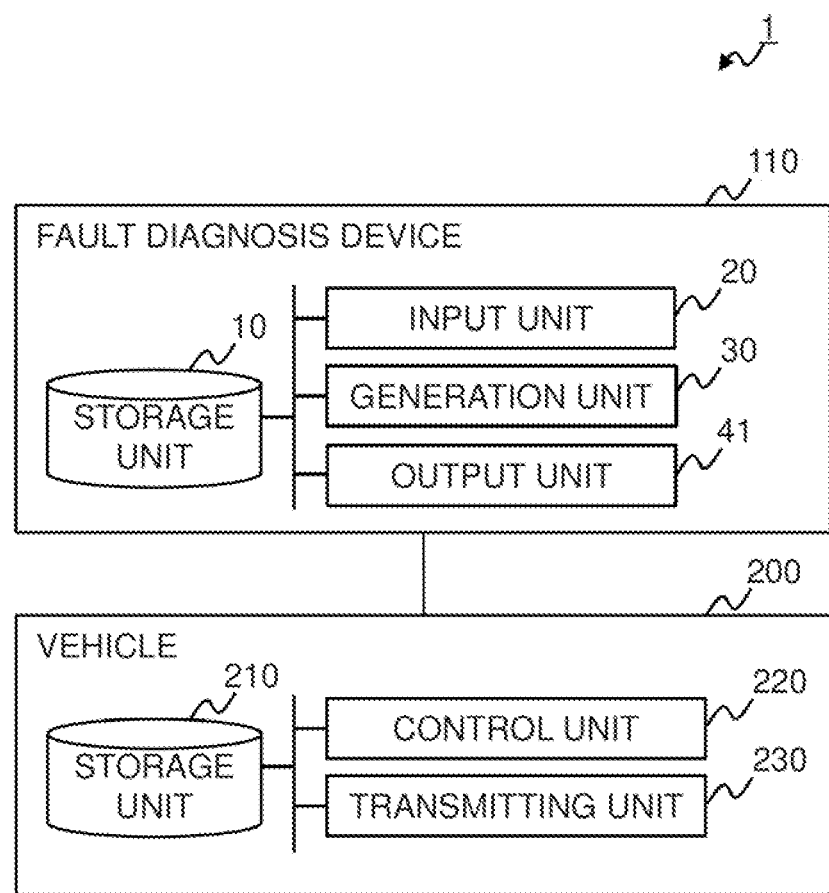
FIG. 3 It depicts a block diagram showing a configuration example of an exemplary embodiment of a fault diagnosis system according to the exemplary aspect of the present invention.

FIG. 3 is a block diagram showing a configuration example of an exemplary embodiment of a fault diagnosis system according to the exemplary aspect of the present invention. The fault diagnosis system 1 of this exemplary embodiment comprises a fault diagnosis device 110 and a vehicle 200.

The fault diagnostic device 110 and the vehicle 200 are interconnected via communication lines. In the example shown in FIG. 3, one vehicle 200 is described, but the number of vehicles 200 is not limited to one, and may be two or more.

The vehicle 200 includes a storage unit 210, a control unit 220, and a transmitting unit 230. A device including the storage unit 210, the control unit 220, and the transmitting unit 230 can be referred to as a vehicle control unit that controls the vehicle 200.

The storage unit 210 stores various information necessary for the vehicle 200 to perform a process. Specifically, the storage unit 210 stores observation data observed in the own vehicle and fault data output when a fault is detected. In addition, the storage unit 210 stores the feature master generated by the fault diagnostic system 110. The storage unit 210 is realized, for example, by a magnetic disk, an SD memory card, or the like.

The control unit 220 obtains observation data observed in the vehicle 200 and stores it in the storage unit 210. For example, when observation data of a vehicle operating at a speed of 0 is used to generate a feature master, the control unit 220 may obtain the observation data while idling.

The control unit 220 of this exemplary embodiment detects a sign of fault by determining the similarity between the features of the observation data included in the feature master and the features of the observation data obtained in the own vehicle. Specifically, the control unit 220 compares observation data obtained under the same environmental conditions as those under which the observation data on which the feature master was generated was obtained with the feature master, and if observation data indicating a feature that is not similar to the feature included in the feature master is found, it may be determined that there is a sign of fault.

For example, when a feature master is generated based on observation data obtained when the speed is 0 mph as an environmental condition, the control unit 220 compares the observation data obtained when the speed is 0 with the feature master. Then, if the observation data indicating a feature that are not similar to the feature included in the feature master are found, the control unit 220 may determine that there is a sign of fault.

The method by which the control unit 220 extracts features of the observation data is the same as the method by which the generation unit 30 extracts features of the observation data.

Figure 4:
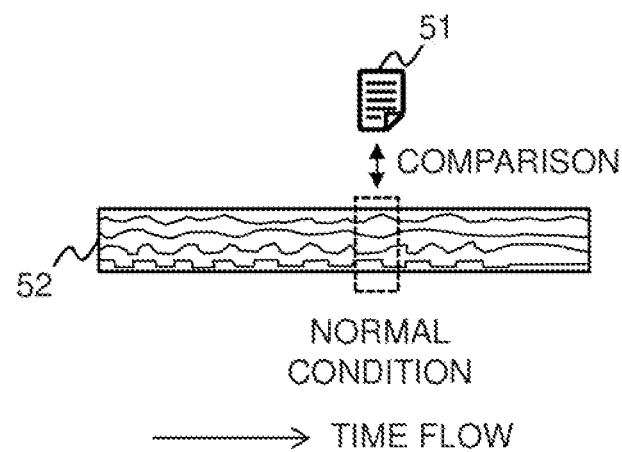
FIG. 4 It depicts an explanatory diagram showing an example of a process for detecting a sign of a fault.

FIG. 4 is an explanatory diagram showing an example of a process for detecting a sign of a fault. The control unit 220 may compare the feature master 51 generated in advance with the pattern of the CAN data 52 which is the observation data, if they match (or have a certain degree of similarity), the vehicle may be determined to be in a normal condition. If it is determined that the vehicle is not in a normal condition, the control unit 220 may output some alert to a display device (not shown).

The control unit 220 may determine the similarity of time series data sets using, for example, the method described in the non-patent literature 1.

In FIG. 4, the case of a single feature master is shown as an example, but the feature master to be compared by the control unit 220 is not limited to one. A single feature master may include multiple features indicating normal conditions, and there may be multiple feature masters to be compared. By having multiple feature masters, it is possible, for example, to separately manage the normal condition that is generally assumed and the normal condition in a special environment.

The transmitting unit 230 transmits the observation data obtained by the vehicle 200 to the fault diagnostic device 110. The observation data stored in the storage unit 210 may be manually input to the fault diagnostic device 110.

The fault diagnostic device 110 comprises the storage unit 10, the input unit 20, the generation unit 30, and the output unit 41. In other words, the fault diagnosis device 110 of this exemplary embodiment has the same configuration as the fault diagnosis device 100 of the first exemplary embodiment. However, the output unit 41 of this exemplary embodiment, compared to the output unit 40 of the first exemplary embodiment, has an additional function of trans-mitting a feature master to the vehicle 200. The input unit 20 may receive input of observation data transmitted from the vehicle 200.

The output 41 transmits the generated feature master to the vehicle 200. At this time, the output unit 41 may transmit the generated feature master to other vehicles other than the vehicle from which the observation data indicating normal condition was obtained. In this way, by transmitting the feature master to vehicles 200 other than the vehicle from which the observation data was collected, it is possible to detect a sign of fault in the other vehicle 200

If the generation unit 30 generates feature masters for each type of vehicle, the output 41 may transmit the corresponding feature master for the same type of vehicle. Since features indicating normal conditions are likely to be similar to features observed in vehicles of the same type, this makes it possible to improve the accuracy of detecting the sign of fault. If the generation unit 30 generates a feature master based on the characteristics of an individual, the output unit 41 may transmit the features to the vehicle driven by the individual.

The control unit 220 and the transmitting unit 230 are realized by a processor of a computer that operates according to a program (control program). The input unit 20, the generation unit 30, and the output unit 41 realized by a processor of a computer that operates according to a program (fault diagnosis program).

Figure 5:
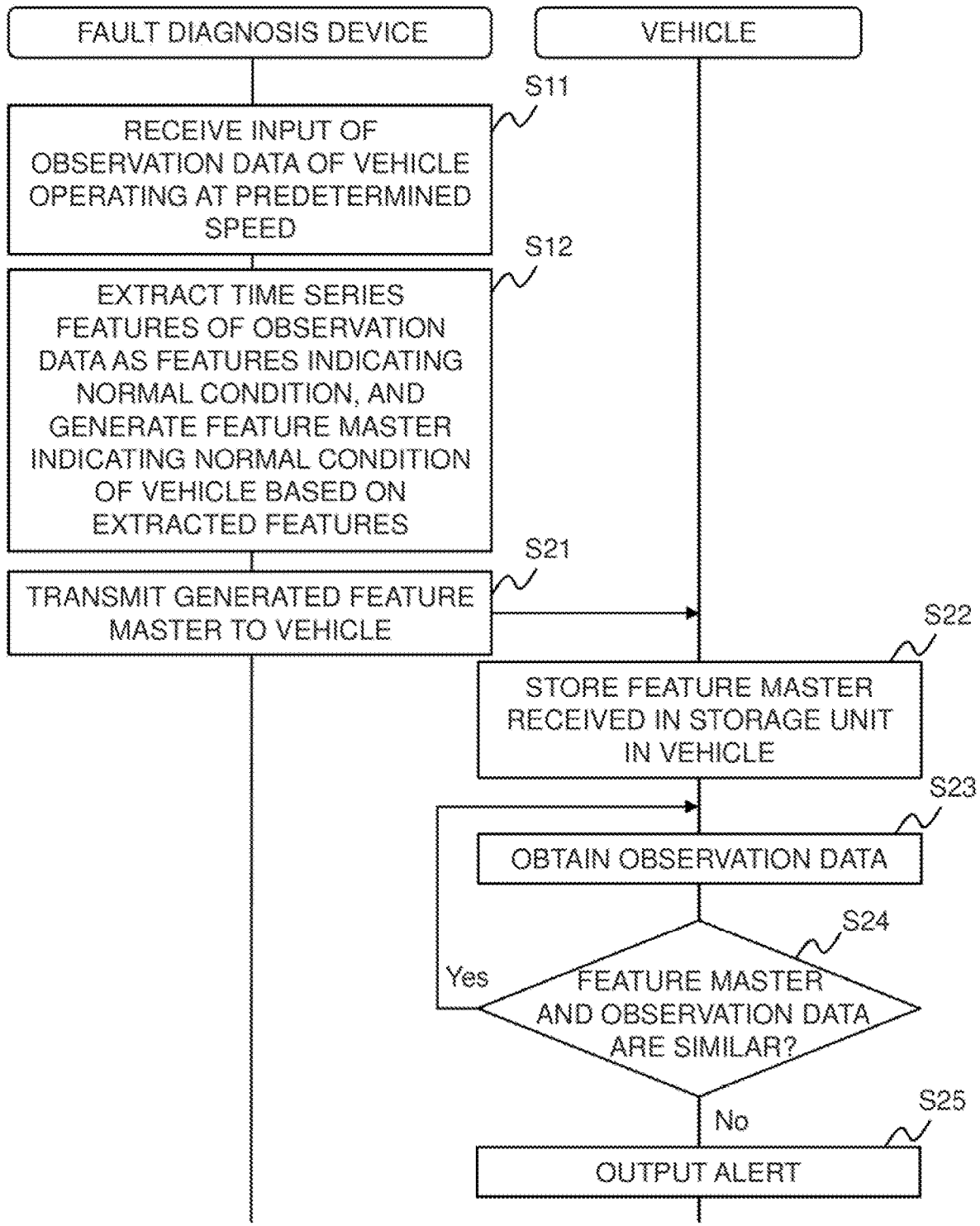
FIG. 5 It depicts a flowchart showing an operation example of a fault diagnosis system.

Next, the operation example of this exemplary embodiment will be described. FIG. 5 is a flowchart showing an operation example of the fault diagnosis system 1 of this exemplary embodiment. The process up to the fault diagnosis system 110 generates a feature master is the same as the processes from step S11 to step S12. The output unit 41 transmits the generated feature master to the vehicle 200 (step S21).

The control unit 220 of the vehicle 200 stores the feature master received from the fault diagnosis device 110 in the storage unit 210 in the vehicle 200 (step S22). The control unit 220 also obtains observation data in the own vehicle at any time (step S23), and determines the similarity between the features of the observation data included in the feature master and the features of the obtained observation data (step S24). If it is determined that the two are not similar (No in step S24), the control unit 220 outputs an alert indicating that a sign of fault has been detected (step S25). On the other hand, if the two are determined to be similar (Yes in step S24), then the processing after step S23 for obtaining the observation data is repeated.

As described above, in addition to the configuration of the first exemplary embodiment, in this exemplary embodiment, the output unit 41 transmits the generated feature master to the vehicle 200, and the control unit 220 of the vehicle 200 detects a sign of fault by determining the similarity between the features of the observation data included in the received feature master and the observation data obtained in the own vehicle. Therefore, in addition to the effect of the first exemplary embodiment, it is possible to determine a sign of vehicle fault in real time.

Figure 6:
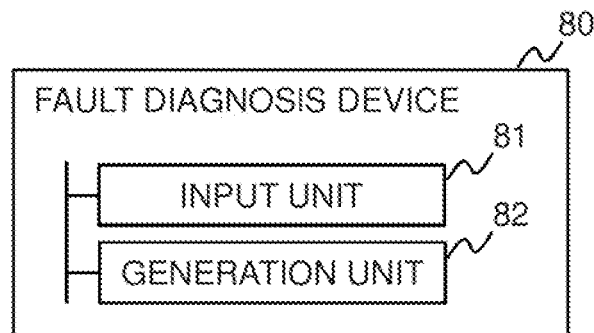
FIG. 6 It depicts a block diagram showing an overview of a fault diagnostic device according to the exemplary aspect of the present invention.

Next, an overview of the present invention will be described. FIG. 6 is a block diagram showing an overview of a fault diagnostic device according to the exemplary aspect of the present invention. The fault diagnosis device 80 (for example, the fault diagnosis system 100) according to the exemplary aspect of the present invention comprises an input 81 (for example, the input unit 20) which receives input of observation data of a vehicle operating at a predetermined speed, a generation unit 82 (for example, the generation unit 30) which extracts time series features of the observation data as features indicating a normal condition, and generates a feature master indicating the normal condition of the vehicle based on the extracted features.

With such a configuration, it is possible to generate information that can be used to diagnose the normal condition of a vehicle.

Specifically, the input unit 81 may receive the input of the observation data of the vehicle operating at a speed of 0 (for example, idling), and the generation unit 82 may extract the time series features of the observation data as features indicating the normal condition of the vehicle during idling.

Alternatively, the input unit 81 may receive the input of the observation data of the vehicle driving at speeds higher than a predetermined speed (for example, 80 km/h) on a highway, and the generation unit 82 may extract the time series features of the observation data as features indicating the normal condition of the vehicle operating at the speed or higher.

The generation unit 82 may also extract time series features of the observation data obtained under special environment as features indicating the normal condition of the vehicle in the special environment (for example, cold regions).

Figure 7:
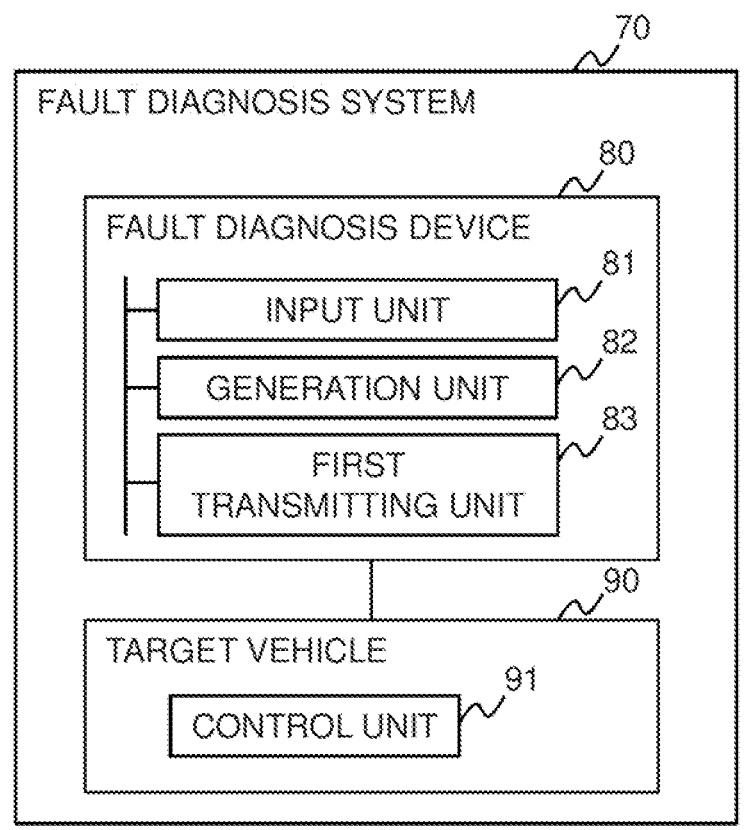
FIG. 7 It depicts a block diagram showing an overview of a fault diagnosis system according to the exemplary aspect of the present invention.

FIG. 7 is a block diagram showing an overview of a fault diagnosis system according to the exemplary aspect of the present invention. The fault diagnosis system 70 (for example, the fault diagnosis system 1) according to the exemplary aspect of the present invention comprises the fault diagnosis device 80 described above and a target vehicle 90 (for example, the vehicle 200) which receives information from the fault diagnostic device 80.

The fault diagnosis device 80 further includes a first transmitting unit 83 (for example, the output unit) which transmits the generated feature master to the target vehicle 90. The target vehicle 90 includes a control unit 91 (for example, the control unit 220) which detects a sign of fault by determining the similarity between the features of the observation data included in the received feature master and the observation data obtained in the own target vehicle.

Even with such a configuration, it is possible to generate information that can be used to diagnose the normal condition of a vehicle, and furthermore, to determine a sign of vehicle fault in real time.

The target vehicle 90 also may include a second transmitting unit (for example, the transmitting unit 230) which transmits the observation data of the own target vehicle 90 to the fault diagnostic device 80. The control unit 91 may obtain observation data during idling, and the second transmitting unit may transmit the obtained observation data to the fault diagnosis device 80. The input unit 81 of the fault diagnostic device 80 may then receive input of the observation data transmitted from the target vehicle 90.

A part of or all of the above exemplary embodiments may also be described as, but not limited to, the following supplementary notes.

(Supplementary note 1) A fault diagnosis device comprising:
an input means for receiving input of observation data of a vehicle operating at a predetermined speed; and
a generation means for extracting time series features of the observation data as features indicating a normal condition, and generating a feature master indicating the normal condition of the vehicle based on the extracted features.

(Supplementary note 2) The fault diagnosis device according to Supplementary note 1, wherein
the input means receives the input of the observation data of the vehicle operating at a speed of 0, and
the generation means extracts the time series features of the observation data as features indicating the normal condition of the vehicle during idling.

(Supplementary note 3) The fault diagnosis device according to Supplementary note 1, wherein
the input means receives the input of the observation data of the vehicle driving at speeds higher than a predetermined speed on a highway, and
the generation means extracts the time series features of the observation data as features indicating the normal condition of the vehicle operating at the speed or higher.

(Supplementary note 4) The fault diagnosis device according to any one of Supplementary notes 1 to 3, wherein
the generation means extracts time series features of the observation data obtained under special environment as features indicating the normal condition of the vehicle in the special environment.

(Supplementary note 5) The fault diagnosis device according to any one of Supplementary notes 1 to 4, wherein
the generation means divides the observation data of the time series into multiple segments to generate observation data of a partial time series, and extracts the features of the observation data for each segment to generate the feature master.

(Supplementary note 6) The fault diagnosis device according to any one of Supplementary notes 1 to 5, wherein
the input means receives the input of communication data specified by a CAN protocol indicating the observation data or data obtained by an OBD.

(Supplementary note 7) A fault diagnosis system comprising:
the fault diagnostic device of any one of Supplementary notes 1 to 6; and
a target vehicle which receives information from the fault diagnostic device,
wherein the fault diagnostic device includes
a first transmitting means for transmitting the generated feature master to the target vehicle, and
wherein the target vehicle includes
a control means for detecting a sign of fault by determining the similarity between the features of the observation data included in the received feature master and the observation data obtained in the own target vehicle.

(Supplementary note 8) The fault diagnosis system according to Supplementary note 7,
wherein the target vehicle includes a second transmitting means for transmitting the observation data of the own target vehicle to the fault diagnostic device,
wherein the control means obtains observation data during idling,
wherein the second transmitting means transmits the obtained observation data to the fault diagnosis device, and
wherein the input means of the fault diagnosis device receives input of the observation data transmitted from the target vehicle.

(Supplementary note 9) The fault diagnosis system according to Supplementary note 7 or 8,
wherein the control means compares observation data obtained under same environmental conditions as those under which the observation data on which the feature master was generated was obtained with the feature master, and determines that there is the sign of fault when observation data indicating features not similar to those included in the feature master is found.

(Supplementary note 10) The fault diagnosis system according to any one of Supplementary notes 7 to 9, wherein
the generation means generates the feature master for each type of vehicle, and
wherein the transmitting means transmits the corresponding feature master for the same type of target vehicle.

(Supplementary note 11) A fault diagnosis method, wherein a computer
receives input of observation data of a vehicle operating at a predetermined speed, and
wherein the computer extracts time series features of the observation data as features indicating a normal condition, and generates a feature master indicating the normal condition of the vehicle based on the extracted features.

(Supplementary note 12) The fault diagnosis method according to Supplementary note 11, wherein the computer
receives the input of the observation data of the vehicle operating at a speed of 0, and
wherein the computer extracts the time series features of the observation data as features indicating the normal condition of the vehicle during idling.

(Supplementary note 13) A fault diagnosis method according to Supplementary note 11 or 12, wherein the computer
transmits the generated feature master to the target vehicle, and wherein the target vehicle detects a sign of fault by determining the similarity between the features of the observation data included in the received feature master and the observation data obtained in the own target vehicle.

(Supplementary note 14) A program recording medium in which a fault diagnosis program is recorded, the fault diagnosis program causing a computer to execute:
an input process of receiving input of observation data of a vehicle operating at a predetermined speed; and
a generation process of extracting time series features of the observation data as features indicating a normal condition, and generating a feature master indicating the normal condition of the vehicle based on the extracted features.

(Supplementary note 15) The program recording medium according to Supplementary note 14, in which the fault diagnosis program is recorded, the fault diagnosis program causing the computer to execute:
receiving the input of the observation data of the vehicle operating at a speed of 0, in the input process; and
extracting the time series features of the observation data as features indicating the normal condition of the vehicle during idling, in the generation process.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST

1 Fault diagnosis system
10 Storage unit
20 Input unit
30 Generation unit
40, 41 Output unit
100, 110 Fault diagnosis device
200 Vehicle
210 Storage unit
220 Control unit
230 Transmitting unit

What is claimed is:

1. An apparatus comprising:
a memory storing instructions; and
one or more processors configured to execute the instructions to:
receive input of observation data of a vehicle during idling, the observation data being observed in time series; and
extract time series features of the observation data as features indicating a normal condition of the vehicle during idling; and generate, based on the extracted features, a feature master indicating the normal condition of the vehicle based on the extracted features.

2. The apparatus according to claim 1, wherein the processor is further configured to execute instructions to:
receive the input of the observation data of the vehicle during driving, the observation data being observed in time series; and
extract the time series features of the observation data as features indicating the normal condition of the vehicle during driving.

3. The apparatus according to claim 1, wherein the processor is further configured to execute instructions to
extract time series features of the observation data obtained under special environment as features indicating the normal condition of the vehicle in the special environment.

4. The apparatus according to claim 1, wherein the processor is further configured to execute instructions to
divide the observation data of the time series into multiple segments to generate observation data of a partial time series, and extract the features of the observation data for each segment to generate, based on the extracted features, the feature master.

5. The apparatus according to claim 1, wherein the processor is further configured to execute instructions to
receive the input of communication data specified by a CAN protocol as the observation data or data obtained by an OBD as the observation data.

6. A system comprising:
the apparatus of claim 1; and
a target vehicle which receives information from the apparatus,
wherein the processor of the apparatus is further configured to execute instructions to
transmit the generated feature master to the target vehicle, and
wherein the target vehicle includes
controller configured to determine the similarity between the features of the observation data included in the received feature master and the observation data obtained in the own target vehicle, and detect a sign of fault on the basis of the similarity.

7. The system according to claim 6,
wherein the target vehicle includes a second transmitter configured to transmit the observation data of the own target vehicle to the apparatus,
wherein the controller is configured to obtain observation data during idling,
wherein the second transmitter is configured to transmit the obtained observation data to apparatus, and wherein the processor of the apparatus is further configured to execute instructions to receive input of the observation data transmitted from the target vehicle.

8. The system according to claim 6, wherein the controller is configured to compare observation data obtained under same environmental conditions as those under which the observation data on which the feature master was generated was obtained with the feature master, and determine that there is the sign of fault when observation data indicating features not similar to those included in the feature master is found.

9. The system according to claim 1, wherein the processor of the apparatus is further configured to execute instructions to:
generate the feature master for each type of vehicle; and
transmit the corresponding feature master for the same type of target vehicle.

10. A method, wherein a computer
receives input of observation data of a vehicle during idling, the observation data being observed in time series, and
wherein the computer extracts time series features of the observation data as features indicating a normal condition of the vehicle during idling; and generates, based on the extracted features, a feature master indicating the normal condition of the vehicle based on the extracted features.

11. A method according to claim 10, wherein the computer
transmits the generated feature master to the target vehicle, and wherein the target vehicle detects a sign of fault by determining the similarity between the features of the observation data included in the received feature master and the observation data obtained in the own target vehicle.

12. A non-transitory computer readable information recording medium storing a program, when executed by a processor, that performs a method for:
receiving input of observation data of a vehicle during idling, the observation data being observed in time series; and
extracting time series features of the observation data as features indicating a normal condition of the vehicle during idling; and generating, based on the extracted features, a feature master indicating the normal condition of the vehicle based on the extracted features.

* * * * *